United States Patent [19]

Shelton

[11] 4,307,788
[45] Dec. 29, 1981

[54] STAND-UP SNOW VEHICLE

[76] Inventor: Stuart T. Shelton, 235 Fairview Ave., Apt. #1, Council Bluffs, Iowa 51501

[21] Appl. No.: 94,778

[22] Filed: Nov. 16, 1979

[51] Int. Cl.³ .............................................. B62M 27/02
[52] U.S. Cl. .................................. 180/181; 180/180; 180/190; 280/16; 280/21 R
[58] Field of Search ............... 180/180, 181, 182, 184, 180/186, 190, 191, 192, 193; 280/12 H, 16, 17, 21 R, 21 A, 11.115, 87.04 R

[56] References Cited

U.S. PATENT DOCUMENTS

| 1,968,975 | 8/1934 | Upsacker et al. | 280/16 |
| 3,151,876 | 10/1964 | Hahto | 280/16 |
| 3,707,199 | 12/1972 | Gerich et al. | 180/190 |
| 3,783,958 | 1/1974 | Canavan | 180/184 |
| 3,791,469 | 2/1974 | Prosser et al. | 180/180 |
| 3,799,565 | 3/1974 | Burtis et al. | 180/182 |
| 4,162,088 | 7/1979 | Best et al. | 180/190 |

Primary Examiner—Joseph F. Peters, Jr.
Assistant Examiner—Donn McGiehan
Attorney, Agent, or Firm—Hiram A. Sturges

[57] ABSTRACT

A motorized "stand-up" snow vehicle comprising a frame having a driving means thereon, a forward steering ski controlled by a steering unit which extends to a height above the frame sufficient to be easily grasped by a standing operator. The steering unit is a vertical steering rod causing turning to the right when its upper end is moved to the right.

12 Claims, 9 Drawing Figures

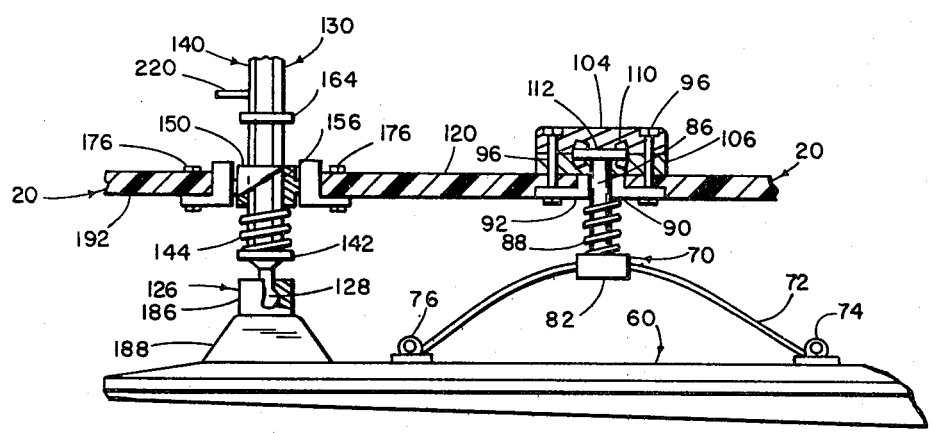

STAND-UP SNOW VEHICLE

BACKGROUND OF THE INVENTION

Heretofore, much pleasure has been experienced by persons who are skillful enough to maneuver and stay upright on skate boards with roller-skate-like wheels underneath a platform having a flat surface. However, although skate boards have been in existence for many years, no one has ever applied the standup principle to a motorized snow vehicle.

It is, therefore, an object of this invention to provide a motorized snow vehicle designed for a person to stand on it with the control of the steering being done by the operator's hand by means of a steering unit extending sufficiently high above the frame as distinguishes from a snow vehicle of the riding type.

A further distinction from snowmobiles of the "sit-down" riding type is that there is a sufficient space provided on my vehicle behind the steering unit to permit the operator's body to stand there unobstructed by a seat or any other obstacle. A particular objective is to provide a stand-up snowmobile in which there is room behind a steering rod for the operator to have both of his feet on the platform with one foot in front of the other or the front of one foot in front of the front of the other.

Still another important feature is to provide the steering unit with a construction such that it can be moved from side to side at its upper end for controlling the direction of travel of the snowmobile from side to side.

Another feature is the control of the throttle of the engine by a suitable control unit at the top of the steering rod, the control unit being a rotatable handle with special connections in the mechanism to make it possible for the rotating of the handle to pull on the throttle wire of the throttle cable extending down through a hollow steering rod.

Snowmobiles have relied on the upward curve of the forward end of a drive belt as it goes around a forward pulley for facilitating the climbing over of snow. But, I propose that the belt pulleys have a forwardmost pulley substantially higher than the remaining pulleys to sharply upturn the belt for excellent climbing over obstacles, with the belt held down at the necessary place on top by an idler pulley.

I contemplate that my snow vehicle would travel at high speeds, very high speeds, in fact, when one considers that the operator will be standing up. Speeds as high as 40 miles an hour might be used. Since the frame would be short and no wider than to have space enough for the operator's feet, therefore, skill and coordination are very important. It is important that the operator be able to bend his body at the hips with his knees bent and with the handle at the height of his hip joint. A handle higher or lower then that would hamper the operator's balance and skill.

Since I have discovered that it is important for the handle to be at the operator's hip, I propose an adjustable steering rod to fit operators at different heights.

The same steering rod adjustability feature will allow the steering rod to be taken apart and folded down against the frame for compact shipment or storage, and yet will provide a stiff total rod of fixed length.

SUMMARY OF THE INVENTION

A main goal of this invention is to provide a motorized "stand-up" snow vehicle comprising a frame having a driving means thereon, a forward steering ski controlled by a steering unit which extends to a height above the frame sufficient to be easily grasped by an operator who is standing, a substantially open space extending back from the steering unit and being suitable for accommodating a man in a standing position, with the man's feet disposed one in front of the other and with the steering unit comprising a rod, the upper end of which is held in the hand so that as the upper end of the rod is moved toward a side of the ski to which turning is desired, the ski will turn in that direction, turning the entire vehicle.

Another goal is to provide a track system having an upper forwardmost pulley.

A further goal is to provide a steering rod capable of moving up and down with respect to the frame and to move up and down with the ski therebeneath and attached thereto.

Still another goal is to provide a rotating handle on the upper end of the steering rod for controlling a throttle cable assembly which extends down through the steering rod.

Yet a further goal is to provide the upper end of the steering rod with a forward inclination for safety purposes.

BRIEF DESCRIPTION OF DRAWINGS

FIG. 4 is a side elevation of the ski and lowermost parts of the frame with the closest half of the frame being broken away and the remainder shown in section, and with many of the adjacent parts of the rotational ski mounting and of the steering unit pivotal mounting being shown in a vertical section taken on a vertical plane extending through the center of the vehicle from forward to rearward, the forward part of the ski being removed and portions of the rotational support unit for the ski which are below the frame being shown in full, portions of the steering rod bearing being broken away and a portion of the housing of a ball joint being broken away, but the remainder of the steering unit that is below the frame being shown in full lines.

FIG. 5 is a top plan view of the steering rod receiving bearing and its forward and rearward trunions, a portion of the forward trunion being broken away.

FIG. 6 is a sectional view taken along the line 6—6 of FIG. 5, but also showing adjacent parts of the frame, a portion of the steering rod bearing being shown in dotted lines in an inclined position illustrating the operation of a limit member thereon which strikes the frame to control the tilting of the steering rod.

FIG. 7 is a view showing the uppermost part of the steering rod with the handle thereon, adjacent portions of the handle being broken away along a vertical plane extending forward to rearward whereby parts are shown in section.

DESCRIPTION OF THE PREFERRED EMBODIMENT

Figure 1:
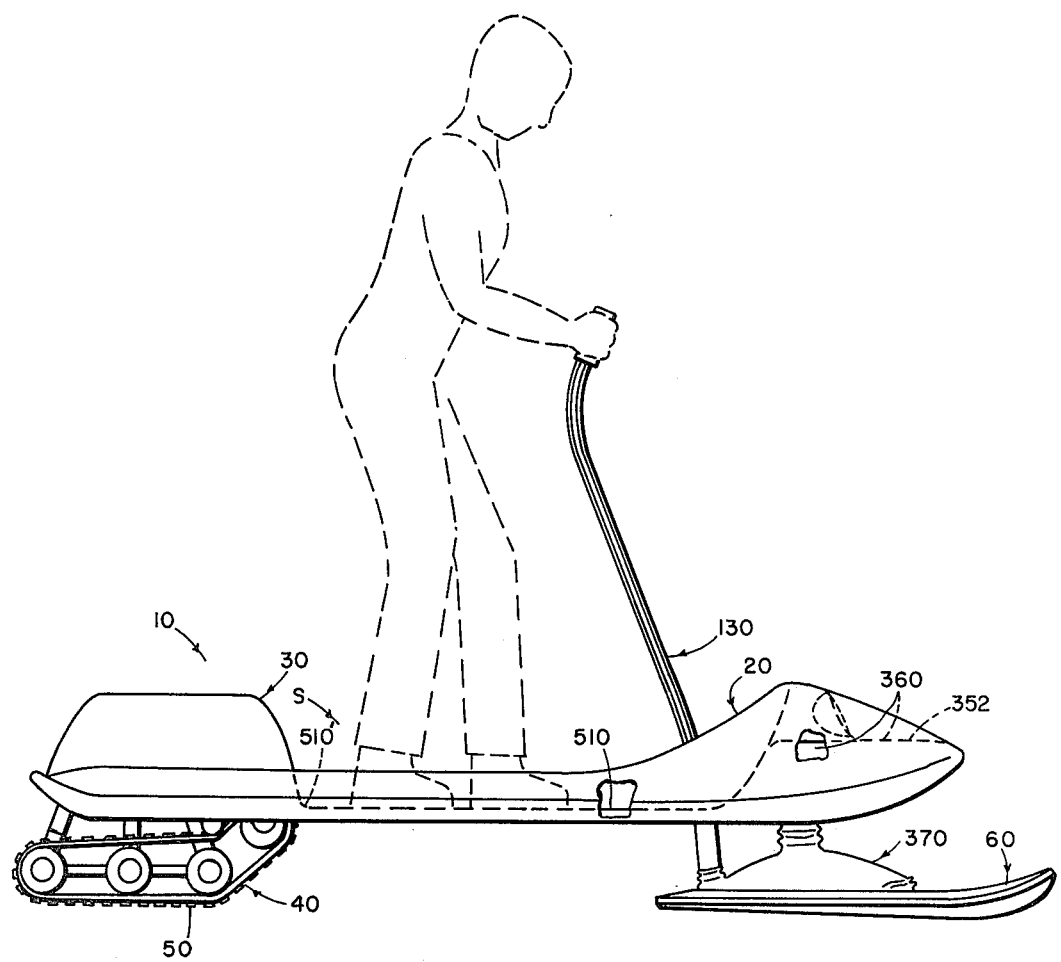
FIG. 1 is a side elevation of the stand-up snow vehicle of this invention shown with an operator thereon in dotted lines.
Figure 3:
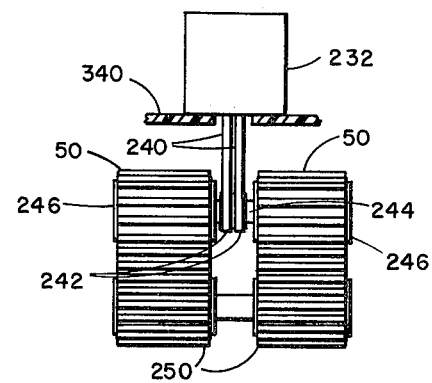
FIG. 3 is a rear elevation of the rear half of the snow vehicle with the frame of the snow vehicle removed, except for a part of a clutch-supporting portion and with all parts of the driving assembly that are rearward of the clutch being removed.

The motorized stand-up snow vehicle of this invention is generally indicated at 10 in FIG. 1 and has a frame 20 having a driving assembly 30 mounted on its rearward end and having a ground-engaging assembly 40 mostly disposed beneath the frame 20 provided with belts 50, as seen in FIG. 1 and as seen in FIG. 3.

A steering ski 60 is disposed beneath the frame 20 at the forward end thereof.

A pivotal mounting assembly generally indicated at 70 in FIG. 4 connects the ski 60 to the frame 20.

The pivotal mounting assembly 70 has a leaf spring 72 arching upwardly at its center and having its forward and rearward ends pivotally fixed at 74 and 76 to the ski 60, as best seen in FIG. 4.

The center of the spring 72 is attached by suitable connection assembly 82 to a vertically extending shaft 86 which extends upwardly from and is attached to the assembly 82 with a spring disposed between the assembly 82 and the underside of the bearing 90 which is arranged for rotatably receiving the shaft 86 and for providing its underside 92 for the engagement of the spring 88 therewith. The bearing 90 is held against the underside of the platform 20 by bolts 96.

The bolts 96 interconnect an upper housing 104 and a lower housing 106 which hold therebetween an upper bearing 110 engaging a transverse and horizontal flange 112 on the upper end of the pivot shaft 86.

The bolts 96 extend down through a lower part 120 of the frame 20, the part 120 being a floor, and hold the bearing 90 in place.

At the rearward end of the ski 60 and a substantial distance thereabove a ball and socket joint 126 is disposed having a ball 128 fixed to the lower end of a hexagonal steering rod 130 of a steering unit 140, the steering rod 130 having a shoulder 142 thereon above the ball and socket joint 126, the upper side of which engages the lower side of a coiled spring 144 which extends around the steering rod 130 with its upper end engaging the lower side of a bearing 150 having a hexagonal opening 156 therethrough slidably receiving the steering rod 130 which extends vertically downwardly therethrough and is free to slide in the bearing 150 so that the rearward end of the ski 60 can move up and down to an extent limited by a limiting shoulder 164 fixed to the steering rod 130 a distance above the bearing 150.

As best seen in FIG. 5, the bearing 150 has trunion axles 172 extending forwardly and rearwardly therefrom and received in trunion bearings 174, which latter are fixed to the floor 120 by bolts 176, as seen in FIG. 4, in a manner such that the axis of pivoting of the bearing 150 is in alignment with the floor 120, or in other words, along the axis 180, seen in FIG. 5, which is disposed very closely adjacent the bottom of the floor 120 for disposing the bearing 150 as low as possible without being excessively below the floor 120, so as to give leverage to the steering rod 130. For this same reason, the socket 186 of the ball and socket joint 126 is supported on a support 188 a substantial distance above the ski 60 and closely adjacent the center of the distance between the ski 60 and the bottom 192 of the frame 20 when the ski 60 is horizontal.

The bearing 150 has bearing limiters or rod swing limiters 200 thereon and on the right and left sides thereof having undersurfaces 202 which are adapted to strike adjacent parts of the top of the floor 120 as the bearing 150 tilts, as been seen in FIG. 6, so as to limit the swinging of the steering rod 130 from side to side to less than 45°.

Figure 8:
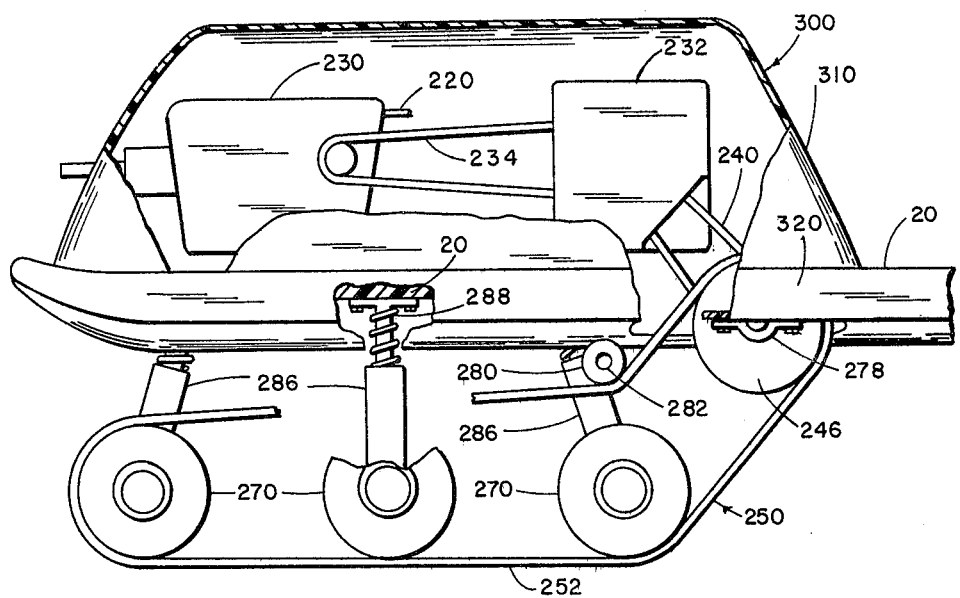
FIG. 8 is a side elevation of the driving assembly of this invention shown by looking at the right side of the rearward half of the snow vehicle with portions of the driving assembly housing and of the frame and of one of the belt pulleys broken away.

Referring now to FIG. 7, the upper end of the steering rod 130 is there shown wherein it can be seen that the rod 130 is hollow at 212 extending from substantially its upper end 214 downwardly to a position above the limiting shoulder 164 of FIG. 4, whereby a throttle cable assembly 220 can extend down through the hollow steering rod 130 and out a rearward side thereof, as shown in FIG. 4, and extend rearwardly to an engine 230, best seen in FIG. 8, which can be a liquid fuel engine.

The throttle assembly 220 is of a conventional type having a housing 222 in which a pull wire 224 slides. The housing 222 can be of a stiff but flexible type anchored at its upper end 226 to a anchor flange 230 which extends horizontally across and is attached to the upper end of the steering rod 130, the attachment being by welding or otherwise at 232.

The exterior of the member 230 is circular, as seen in top plan view, and it is received in a circular notch 242 in a handle 250 which extends upwardly from the steering rod 130, as best seen in FIG. 7.

In FIG. 7, it can be seen that the inner side of the handle 250 is provided with a threaded recess 254 having a vertically extending upright threaded circular wall 255 threadedly receiving thereagainst a non-rotating pulling block 256 which is threaded on its exterior to fit against the threads 255.

The pulling block 256 is prevented from rotation by a pair of sliding keepers 262 which extend vertically downwardly therefrom, each being received in a keeper sleeve 264 fixed to and extending through the member 230. Compression springs 270 urge the block 256 upwardly by engaging the sleeves 264, each spring 270 being disposed between its sleeve 264 and the bearing block 256 and extending around the keepers 262 respectively.

The pull wire 224 is fixed at 278 to the block 256 so that as the block 256 moves up and down because of rotation of the handle 250 by the operator in two opposite directions, the wire 224 will be pulled upwardly or be allowed to move downwardly for controlling the throttling of the engine.

Referring to FIG. 8, at the rearward end of the frame 20 is a drive assembly generally indicated at 300 and having a housing 310 extending upwardly from a horizontal lower part 320 of the frame and housing therein the motor 230, a clutch 232 disposed forwardly of the motor and connected thereto by a belt drive 234, the motor 230 having a throttle cable assembly 220, earlier described, projecting therefrom and connected forwardly, although such is not shown, to the lower end of the steering rod, as seen at 220 in FIG. 4.

The clutch 232 has a belt drive extending downwardly and forwardly from it, as seen at 240, and in FIG. 3 it will be seen that the belt drive 240 drives pulleys 242 on a shaft 244, which latter carries belt drive pulleys 246 thereon, the latter being one on the right of the center of the vehicle and one on the left for carrying traction belts 250, which latter have portions in engagement with the ground, as shown at 252, extending horizontally along the horizontal line of the lowermost sides of three lower inside idler pulleys 270 which are arranged in a horizontal row from forward to rearward of the vehicle with the drive pulley 246 a substantial distance upward from the row of pulleys 270. The drive pulley 246 is fixed to the frame by its axle being carried in bearings 278, as seen in FIG. 8. A downwardly pressing idler pulley 280 is very important for keeping the tension on the belt, the pulley 280 is fixed to the frame in a rotating manner and presses downwardly on the belt in a position on its upper side between the pulleys 246 and the rearmost of the pulleys 270.

The pulleys 270 are each suitably mounted to the frame by pulley carriers 286 which have shock-absorbing springs therein as seen at 288.

The clutch 232 can be supported by a portion of the frame 20, which latter can be a special clutch-supporting portion seen only at 340 in FIG. 3, the latter having an opening therethrough for the belt 240 to extend down through.

Figure 2:
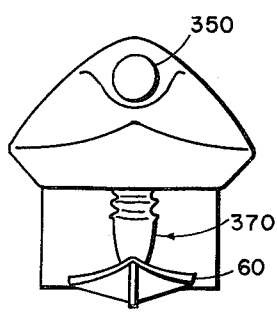
FIG. 2 is a frontal elevation of the snow vehicle, but without the steering rod being shown.

At the forward end of the frame 20, the frame has a substantial height and at its upper side in the center of the frame a head light 350 is mounted, as best seen in FIG. 2, in a special recess 352 provided for the purpose of maintaining an open space for the light to shine forward, although a fuel tank 360 is disposed beneath the recess 352 and the light 350 with the connection, not shown, back to the internal combustion engine 230.

A resilient flexible housing 370 can cover the spring 72, the spring 144 and the spring 88 and all parts thereunder down to the ski 60, as best seen in FIG. 1, for keeping these parts free of mud and the like.

The total length of the snow vehicle frame is to be only three and one-half feet. Since the ski sticks out two feet in front of its pivot axle 86, therefore, the total length of the snow vehicle is somewhat greater than three and one-half feet and can be as much as five and one-half feet because of the additional length the ski projection gives the vehicle. The total length of the ski itself is approximately three feet.

The foot space S as measured from the rearward side of the standing platform as indicated at 510' to the rearwardmost part of the steering rod is preferably approximately two feet to allow sufficient space for the feet of a large man to be disposed on the standing platform 510 with the feet being neither pointed straight forward nor pointed sidewise, but at about a 35° angle to the lengthwise center line of the vehicle.

Figure 9:
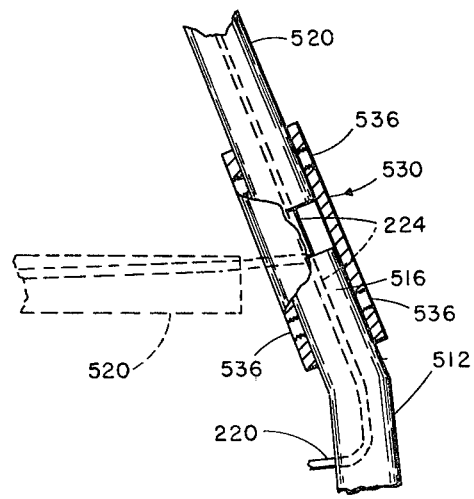
FIG. 9 is a side elevation of a modification of the lower portion of the steering rod showing the adjustability feature and the collapsing feature, the rod being shown in fixed position in full lines and in collapsed position in dotted lines. Parts broken away to show internal construction.

Referring to FIG. 9, a modification of the lower portion of the steering rod is there shown, showing its adjustability feature for variation of height and also for collapsing to a position for shipment.

As seen in FIGS. 1 and 4 the lowermost part of the rod 130 has a straight portion 512 which is vertical and extends down through the standing platform 510. Above the straight portion 512, and of one piece therewith, is a slightly rearwardly extending support rod section 516 spaced below a collapsible section 520 of the steering rod, which latter is spaced from the section 516 and is in alignment therewith. Both the portions 516 and 520 are straight.

A sleeve 530 extends over the support rod sections 16 and 520. Set screws 536 extending through the sleeve 530 are adapted to releasably fix it to the rod sections 516 and 520, whereby with the lower set screws 536 backed off, the sleeve 536 can be removed from the support section 516, so as to be collapsed into a position within the outline of the remainder of the snow vehicle for easy shipment after also releasing the upper set screws 536 and sliding the sleeve upwardly along the rod section 520. Then the flexibility of the throttle cable 224 will permit it to bend rearwardly so that the rod section 520 can assume the lower dotted line position of FIG. 9.

The new snow vehicle hereof can be operated as seen in FIG. 1 by a person standing with the upper end of the steering rod in his hand and with one of his feet disposed behind the other because there is adequate room, whereby when it is desired to turn to the right, for example, the operator need only move the upper end of the steering rod to the right. This will cause the lower end of the steering rod to move to the left causing the rearward end of the ski 60 to move to the left, whereby the forward end turns to the right so that the net effect is that the entire vehicle moves toward whatever side the upper end of the steering rod is moved.

It is very important the operator be able to have this feet one behind the other. That is the only way that there is good stability during deceleration or acceleration to keep the operator from falling down. It is true that some stability can be gained by holding on to a stiff steering mechanism if the vehicle is inadequate in the spacing for allowing a person to have his feet one in front of the other, but any steering mechanism moves to some extent either to rotate or to swing. So steering mechanisms are not all that stable to hold on to.

The steering mechanism of this invention is particularly less stable because it is free to swing from side to side and that has its own advantages in more excellent steering. But, its disadvantage is that it does have greater motion, therefore, it is a less secure thing for an operator to hold on to. Because of that, it is that much more important that the platform have room for the operator to be able to place one foot in front of the other.

I claim:

1. A motorized stand-up snow vehicle comprising a frame, said frame having forward and rearward ends and right and left sides, a driving means mounted on said frame and having portions extending beneath said frame for engaging surfaces over which said vehicle is traveling, a steering ski disposed beneath said frame and disposed forwardly of said driving means, said driving means and said ski elevating said frame from said surfaces means mounting a central part of said ski on said frame for the rotation of said ski about an upright axis so that the forward end of said ski can be moved to the right or left, a steering rod extending upwardly from said frame to a point sufficient to be easily grasped by a rider who is standing on said frame, steering train means operably correlating said rod and said ski so that a lateral movement to the right of the top of said rod causes movement to the right of the front of said ski, means pivotally connecting the lower end of said rod to said frame for the movement of the top of said rod to the right and left of said frame, a foot-supporting platform mounted on said frame and having an upper surface of a size for supporting thereon at least one of an operator's feet, there being a standing space disposed rearwardly of said rod which is substantially open for a distance extending back from said rod sufficient for the standing of the operator in such space.

2. The motorized stand-up snow vehicle of claim 1 having said surface-engaging portion being a flexible belt means, a plurality of pulleys in horizontal row disposed inside said flexible belt means and a forward pulley inside said flexible belt means and disposed substantially higher on its underside than the pulleys of said row, means rotatably mounting said pulleys on said frame, and an idler pulley attached to said frame and pressing against the upper side of said belt between said forward pulley and the rearwardmost pulley of said row so as to maintain said belt taut.

3. The motorized stand-up snow vehicle of claim 1 having said steering train means comprising said steering rod extending through said frame, lower pivot means attaching said steering rod to the rearward end of said ski, upper pivot means slidably and rotatably attaching said steering rod to said frame for vertical sliding of said steering rod with respect to said frame so that said ski can move up and down and for permitting said steering rod to swing to the left and right at its upper end so as to cause opposite motions of the rearward end of said ski, said means mounting said ski with said frame being forwardly of said steering rod.

4. The motorized stand up snow vehicle of claim 1 in which said steering rod has a rotating handle mounted on its upper end, said steering rod being hollow, a throttle cable assembly extending upwardly through said steering rod, the lower end of said throttle cable assembly extending out of said steering rod and rearwardly to said engine, and means operatively correlating said rotating handle and said throttle cable assembly so that as said handle is rotated in opposite directions said throttle cable assembly will cause opposite motions of a throttle wire in said throttle cable assembly.

5. The motorized stand-up snow vehicle of claim 4 having said handle inclining forwardly at its upper end so as to be pointed away from the operator for safety.

6. The motorized stand-up snow vehicle of claim 1 having said steering rod having an elongated upwardly extending handle at its upper end, said handle inclining forwardly at its upper end so as to be pointed away from the operator for safety.

7. The motorized stand-up snow vehicle of claim 3 having said steering rod extending up from the level of said upper surface of said foot-supporting platform a suitable distance, said distance being over 24 inches.

8. The motorized stand-up snow vehicle of claim 7 having said distance being over 28 inches.

9. The motorized stand-up snow vehicle of claim 7 having said steering rod having a rotating handle mounted on its upper end, said steering rod being hollow, a throttle cable assembly extending upwardly through said steering rod, the lower end of said throttle cable assembly extending out of said steering rod and rearwardly to said engine, and means operatively correlating said rotating handle and said throttle cable assembly so that as said handle is rotated in opposite directions said throttle cable assembly will cause opposite motions of a throttle wire in said throttle cable assembly.

10. The motorized stand-up snow vehicle of claim 2 having said steering rod extending through said body, lower pivot means attaching said steering rod to the rearward end of said ski, upper pivot means slidably and rotatably attaching said steering rod to said frame for vertical sliding of said steering rod with respect to said frame so that said ski can move up and down and for permitting said steering rod to swing to the left and right at its upper end so as to cause opposite motions of the rearward end of said ski, said means mounting said ski with said frame being forwardly of said steering rod, said steering rod having a rotating handle mounted on its upper end, said steering rod being hollow, a throttle cable assembly extending upwardly through said steering rod, the lower end of said throttle cable assembly extending out of said steering rod and rearwardly to said engine, and means operatively correlating said rotating handle and said throttle cable assembly so that as said handle is rotated in opposite directions said throttle cable assembly will cause opposite motions of a throttle wire in said throttle cable assembly.

11. The motorized stand-up snow vehicle of claim 1 having said steering rod being provided with a collapsible section, said steering rod having a support section below said collapsing section, rod section attaching means releasably interconnecting said collapsible section and said other section in a manner for holding said sections substantially rigid with respect to each other for use and in a manner for permitting said collapsing section to be bent downwardly for shipment, said rod section attaching means being manually disposable into a position permitting collapsing and into a position for holding said collapsing section and said support section substantially rigid with respect to each other.

12. The motorized stand-up snow vehicle of claim 11 having said rod section attaching means being a rigid sleeve extendable over adjacent portions of said collapsible rod section and said support rod section.

* * * * *